No. 837,719. PATENTED DEC. 4, 1906.
G. PICCONE.
HORSE SHOE AND BOOT.
APPLICATION FILED SEPT. 20, 1906.
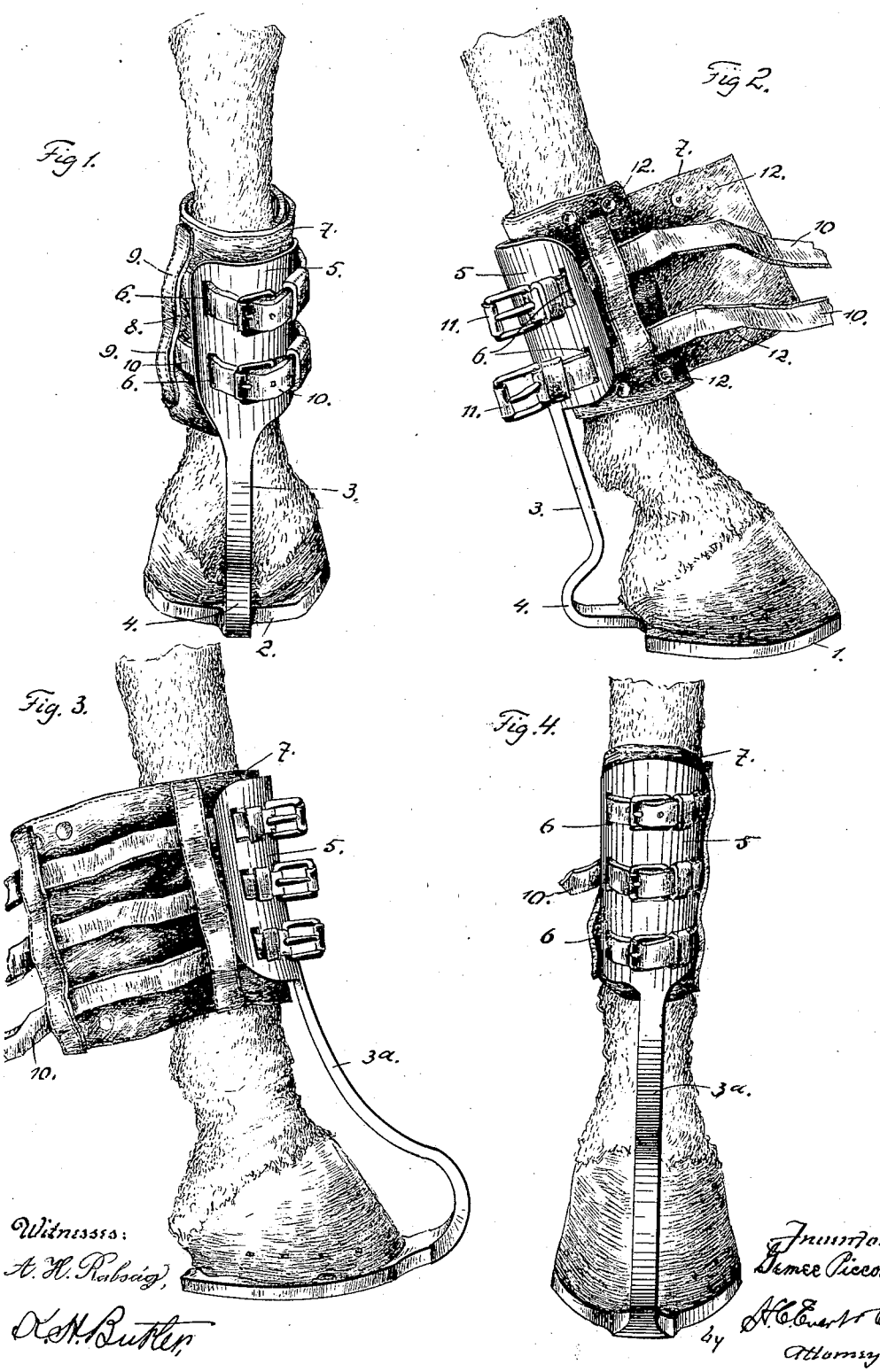

UNITED STATES PATENT OFFICE.

GEMEE PICCONE, OF GLASSPORT, PENNSYLVANIA.

HORSE SHOE AND BOOT.

No. 837,719.     Specification of Letters Patent.     Patented Dec. 4, 1906.

Application filed September 20, 1906. Serial No. 335,451.

*To all whom it may concern:*

Be it known that I, GEMEE PICCONE, a subject of the King of Italy, residing at Glassport, in the county of Allegheny and State of Pennsylvania, have invented certain new and useful Improvements in Horse Shoes and Boots, of which the following is a specification, reference being had therein to the accompanying drawings.

This invention relates to a combination horse shoe and boot; and its object is to provide a veterinary appliance for the treatment of stiff joints, sprains, or like injuries on the legs of horses and like animals.

The invention comprises a horseshoe provided with an upwardly-extending arm terminating in a plate adapted to fit upon the leg of the animal, in combination with a horse-boot suitably connected to said plate.

The construction of the improvement will be more fully described hereinafter in connection with the accompanying drawings, which form a part of this specification, and its novel features will be defined in the appended claims.

In the drawings, Figure 1 is a rear view in perspective, showing a combination boot and horseshoe adapted for the hind leg of an animal. Fig. 2 is a similar view showing the side of the device. Fig. 3 is a similar view showing a form of the invention adapted to be applied to the front leg of the animal, and Fig. 4 is a front elevation of the same.

Referring to Figs. 1 and 2, the reference-numeral 1 designates a horseshoe the sides of which are connected at the rear by an integral plate 2, from which extends an arm 3. This arm extends rearward for a short distance and is then bent upward, as at 4, and projected upward, terminating at the upper end in a concavo-convex plate 5, formed with a plurality of slots 6.

The numeral 7 designates a boot made of leather or like material and provided with strap-guides 8, consisting of strips of leather sewed to the outer surface of the boot and disconnected therefrom along portions of their edges to provide loops 9 for the passage of securing-straps 10, each provided at one end with a buckle 11. The leather boot 7 is adapted to be bound around the leg of the animal and secured thereon by suitable snap-fasteners 12, after which the boot is further secured by the straps 10, which extend through the slots 6 of the plates 5 and are buckled over the plates, as shown in Fig. 1.

In the form of the invention shown in Figs. 3 and 4 the rear connecting-plate 2 of the shoe is omitted and the upwardly-projecting arm $3^a$ projects from the front of the shoe, as shown, being provided with a concavo-convex plate 5, similar to the one already described. This plate is provided with slots 6 and a boot 7, similar to the same parts in Figs. 1 and 2, except that three straps 10 are employed instead of two, a corresponding number of slots and strap-guides therefor being provided.

The utility of the device constructed as thus described will be readily understood and appreciated by those skilled in the art to which the invention relates. The weakened portion of the animal's leg will be firmly braced and supported and defects in formation remedied.

It will be apparent that the invention is not restricted to the precise construction shown, as the number of straps employed, the number and form of the slots in the concavo-convex plates, and other details may be varied at will.

What I claim, and desire to secure by Letters Patent, is—

1. The combination with a horseshoe, of an upwardly-extending arm projecting centrally from the shoe and provided at its upper end with a concavo-convex plate adapted to fit against a horse's leg, boot, and straps for securing said boot to said plate and to the leg of the animal.

2. A veterinary appliance comprising a horseshoe having an integral upwardly-projecting arm, provided at its upper end with a plate adapted to fit against a horse's leg, and provided with slots, and a boot connected to said plate by securing-straps.

In testimony whereof I affix my signature in the presence of two witnesses.

GEMEE PICCONE.

Witnesses:
    G. W. COURSIN,
    FRED GRAVINO.